(12) United States Patent
Rosenkranz et al.

(10) Patent No.: US 8,485,769 B2
(45) Date of Patent: Jul. 16, 2013

(54) SELF-TAPPING SCREW

(75) Inventors: Falk Rosenkranz, Wildhaus (CH);
Corinna Achleitner, Bludenz (AT); Ralf Zitzmann, Feldkirch (AT); Isaiah Freerksen, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 225 days.

(21) Appl. No.: 12/830,072

(22) Filed: Jul. 2, 2010

(65) Prior Publication Data

US 2011/0027035 A1    Feb. 3, 2011

(30) Foreign Application Priority Data

Jul. 9, 2009   (DE) .................. 10 2009 027 582

(51) Int. Cl.
*F16B 25/00*   (2006.01)

(52) U.S. Cl.
USPC ........................ 411/411; 411/424; 411/14

(58) Field of Classification Search
USPC ............ 411/411, 424, 13, 14, 387.4; 116/208
See application file for complete search history.

(56) References Cited

U.S. PATENT DOCUMENTS

| | | | | |
|---|---|---|---|---|
| 890,447 | A | * | 6/1908 | Klausmeyer .................. 411/411 |
| 1,419,058 | A | * | 6/1922 | Klausmeyer .................. 74/89.39 |
| 5,188,496 | A | * | 2/1993 | Giannuzzi .................... 411/386 |
| 6,086,302 | A | * | 7/2000 | Gerhard ..................... 411/387.4 |
| 6,250,295 | B1 | * | 6/2001 | Chanton et al. ............... 125/15 |
| 6,394,023 | B1 | * | 5/2002 | Crocker ....................... 116/208 |
| 6,514,026 | B1 | * | 2/2003 | Gerhard ..................... 411/387.4 |
| 6,786,153 | B2 | * | 9/2004 | Burrow et al. ........... 101/352.13 |
| 7,008,310 | B2 | * | 3/2006 | Andres ......................... 451/398 |
| 2007/0297873 | A1 | * | 12/2007 | Wieser et al. ................ 411/411 |

FOREIGN PATENT DOCUMENTS

EP    1 862 677 B1    12/2007

* cited by examiner

*Primary Examiner* — Flemming Saether
(74) *Attorney, Agent, or Firm* — Crowell & Moring LLP

(57) ABSTRACT

A self-tapping screw is disclosed. The screw includes a shaft which has a first end and an opposing second end with a load-engaging structure, and a thread that extends at least in sections over the length of the shaft. Several wear indicators are provided on the thread. Identifiers are provided on the screw for identifying the wear indicators.

11 Claims, 1 Drawing Sheet

SELF-TAPPING SCREW

This application claims the priority of German Patent Document No. 10 2009 027 582.7, filed Jul. 9, 2009, the disclosure of which is expressly incorporated by reference herein.

BACKGROUND AND SUMMARY OF THE INVENTION

The invention relates to a self-tapping screw.

This type of self-tapping screw is screwed into a predrilled drill hole in the substrate using a suitable tool such as, for example, a screwdriver, drill hammer, screw-wench or the like, wherein the start of the thread of the screw grooves a mating thread into the substrate that corresponds to the thread. The subsequent thread of the screw engages in the mating thread, whereby when a load is applied to the screw, it transmits the load to the substrate. In a soft substrate such as, for example, porous concrete or plasterboard, self-tapping screws can also be screwed in directly without predrilling a drill hole in the soft substrate.

An essential advantage of self-tapping screws is the possibility of unscrewing them from the substrate without parts of the fastening that was created remaining in the substrate. Self-tapping concrete screws, which are driven into mineral substrates, are also used in practice by users for temporary fastenings, for example, in concrete form work, building scaffolding or when configuring drilling and cutting tools in diamond drilling and separating technology. As a result, the self-tapping screws are not only removable, but are also reusable in principle.

Known from European Patent Document No. EP 1 862 677 A1 is a self-tapping screw with a shaft, which has a first end and an opposing second end with a load-engaging means, and with a thread, which extends at least in sections over the length of the shaft, wherein at least one wear indicator means is provided on the thread.

The at least one wear indicator means of the known screw indicates the rate of wear of the thread and thereby allows a conclusion to be drawn about the load capacity or load bearing property of a removed self-tapping screw and about its ability to be reused.

When manufacturing the screw as well as during its use, parts of the thread can break out, which the user might inadvertently interpret as wear indicator means. This could lead to a misinterpretation with respect to the reusability of the screw.

The object of the invention is creating a self-tapping screw, in particular a concrete screw, which can be used several times and in which a simple assessment of usability is possible.

According to the invention, at least one identifier is provided on the screw for identifying the wear indicator.

The at least one identifier guarantees a clear identification of the at least one wear indicator. Because of the identifier provided on the screw, it is no longer possible for any undesired breakouts in the thread or damage to the thread to be inadvertently interpreted as a wear indicator. As a result, even with repeated use of a self-tapping screw that has wear indicators, a reliable assessment by the user with respect to its reusability is guaranteed.

The at least one identifier is preferably provided on a thread flank of the thread and preferably directly adjacent to the wear indicator to be identified by this identifier. The at least one identifier is advantageously configured directly during the forming of the thread on the thread.

The at least one identifier is preferably provided on an outer side of the shaft and advantageously directly adjacent to the wear indicator to be identified by this identifier. The at least one identifier is advantageously configured directly during the forming of the shaft on the shaft.

Several identifiers may be provided on a self-tapping screw, each of which is arranged on the thread flanks of the thread and/or on the outer side of the shaft.

The at least one identifier is preferably a depression provided on the screw, which can be configured in a simple manner during manufacturing of the self-tapping screw, e.g., in a rolling method, on the screw.

The at least one identifier is preferably an elevation provided on the screw, which can be configured in a simple manner during manufacturing of the self-tapping screw, e.g., in a rolling method, on the screw.

Several identifiers may be provided on a self-tapping screw, which are configured as depressions and/or as elevations. In addition, the at least one identifier may also be a profiling, which features only depressions, only elevations, or depressions and elevations.

At least two identifiers are preferably provided for identifying a wear indicator, which make a simple and precise identification of the wear indicator possible.

The at least one identifier preferably has a polygonal design in plan view, whereby the at least one identifier features an advantageous design for identifying the corresponding wear indicator. A corner of the at least one identifier advantageously points in the direction of the to-be-identified wear indicator, thereby further improving the identifiability of the to-be-identified wear indicator. The identifier has an especially advantageous triangular design in plan view.

In an alternative embodiment, the at least one identifier has a round design in plan view, thereby making it possible for the at least one identifier to be configured in a simple way. In addition to a circular design, the at least one identifier may also have an oval design or a design with more than two inflection points.

The invention is explained in greater detail in the following on the basis of exemplary embodiments.

DETAILED DESCRIPTION OF THE DRAWINGS

As a rule, the same parts are provided with the same reference numbers in the Figures.

Figure 1:
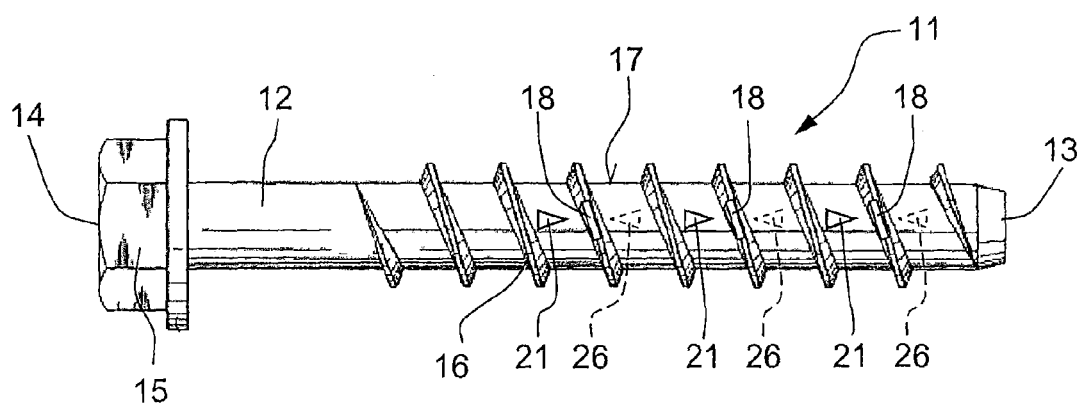
FIG. 1 is a lateral view of a first exemplary embodiment of a screw according to the invention.

FIG. 1 shows a self-tapping screw 11 with a shaft 12, which has a first end 13 and an opposing second end 14 with a load-engaging structure 15 in the form of a hexagonal head, and with a thread 16, which extends in a section over the length of the shaft 12. Provided on the thread 16 are several wear indicators 18, which are configured as recesses and extend from the outer edge of the thread 16 in the direction of the thread root or the outer side 17 of the shaft 12. If the regions of the thread 16 next to one of the wear indicators 18 are worn away for example by abrasion during screwing in the self-tapping screw 11, for example, into mineral substrates, the wear indicator 18 will no longer be recognizable as such. The user will be thereby optically signaled that the lower limit of the load bearing capacity of the self-tapping screw 11 is being fallen short of and the screw is no longer usable at least for certain fastenings.

To clearly identify the wear indicators, each of the wear indicators 18 is assigned an identifier 21, which is provided on the outer side of the shaft 12. The identifiers 21 have a polygonal, in this case triangular, design in plan view. A corner of the identifier 21 points towards the wear indicator for a simple identification of the wear indicator 18. Each identifier 21 is protected on the side facing the load-engaging structure 15 with respect to the corresponding wear indicator 18 and thus at least partially from complete damage during the screw-in process of the self-tapping screw 11.

As an option (thus depicted here only as a dashed line), an additional identifier 26 is provided for the self-tapping screw 11 for each wear indicator 18. In this type of embodiment, each wear indicator 18 is identified by two identifiers 21 and 26 arranged on both sides of the thread turn of the thread 16. The additional identifier 26 in this example also has a triangular design in plan view and respectively a corner pointing to the wear indicator 18. The identifiers 21 and 26 may be depressions and/or elevations.

Figure 2:
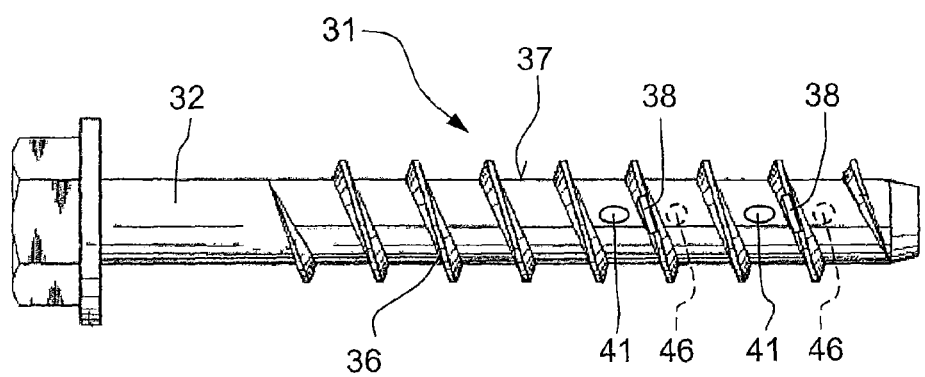
FIG. 2 is a lateral view of a second exemplary embodiment of a screw according to the invention.

The self-tapping screw 31 depicted in FIG. 2 is provided with identifiers 41 arranged on the outer side 37 of the shaft 32 for identifying the wear indicators 38, the identifiers having a round, in this case oval, design in plan view.

As an option (and thus depicted here only as a dashed line), an additional identifier 46 is provided for the self-tapping screw 31 for each wear indicator 38. In this type of embodiment, each wear indicator 38 is identified by two identifiers 41 and 46 arranged on both sides of the thread turn of the thread 36. The additional identifier 46 in this example has a round, in this case circular, design in plan view. The identifiers 41 and 46 may be a depression and/or an elevation.

Figure 3:
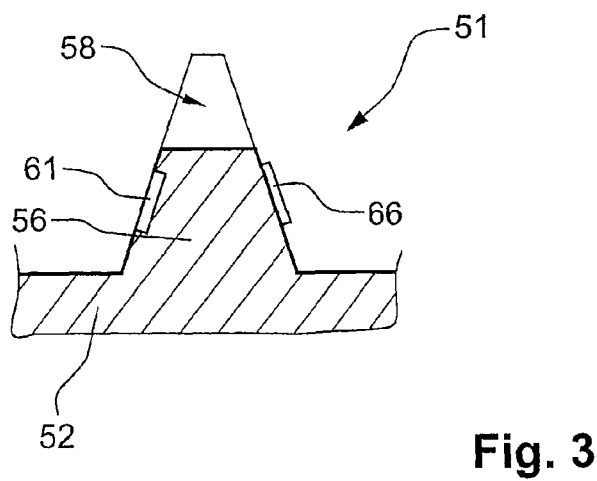
FIG. 3 is a schematic partial section through a thread flank of a third exemplary embodiment of a screw according to the invention.

In the case of a self-tapping screw 51 of which only a section is depicted here in FIG. 3, the screw has identifiers 61 and 66 on each of the two thread flanks of the thread 56 for identifying the wear indicator 58. The identifier 61 in this exemplary embodiment is a depression and may have a polygonal or round design in plan view. The identifier 66 in this exemplary embodiment is an elevation and may also have a polygonal or round design in plan view.

Several differently configured identifiers for identifying the wear indicators may be provided on a self-tapping screw.

The wear indicators 18, 38 and 58 are shown as recesses in the depicted embodiments. The wear indicators may also have a different design, such as described, for example, in EP 1 862 677 A1. In addition, several differently configured wear indicators may be provided on a self-tapping screw.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-tapping screw, comprising:
   a shaft which has a first end and an opposing second end with a load-engaging structure;
   a thread that extends at least in sections over a length of the shaft;
   a wear indicator provided on the thread; and
   an identifier provided on the screw which identifies the wear indicator, wherein the identifier is provided on an outer side of the shaft.

2. The self-tapping screw according to claim 1, wherein the identifier is a depression.

3. The self-tapping screw according to claim 1, wherein the identifier is an elevation.

4. The self-tapping screw according to claim 1, further comprising a second identifier provided on the screw which identifies the wear indicator.

5. The self-tapping screw according to claim 1, wherein the identifier has a polygonal design in a plan view.

6. The self-tapping screw according to claim 1, wherein the identifier has a round design in a plan view.

7. The self-tapping screw according to claim 1, wherein the identifier includes a corner and wherein the corner points toward the wear indicator.

8. A self-tapping screw, comprising:
   a shaft;
   a thread that extends over at least a part of a length of the shaft;
   a wear indicator disposed on the thread; and
   an identifier disposed adjacent to the wear indicator, wherein the identifier is disposed on an outer side of the shaft.

9. The self-tapping screw according to claim 8, wherein the identifier is a depression.

10. The self-tapping screw according to claim 8, wherein the identifier is an elevation.

11. The self-tapping screw according to claim 8, wherein the identifier includes a corner and wherein the corner points toward the wear indicator.

* * * * *